US006480336B2

(12) United States Patent
Digert et al.

(10) Patent No.: US 6,480,336 B2
(45) Date of Patent: *Nov. 12, 2002

(54) MINI-OPTICAL LIGHT SHELF DAYLIGHTING SYSTEM

(75) Inventors: Neall Edward Digert, Carlsbad, CA (US); Michael Joseph Holtz, Boulder, CO (US)

(73) Assignee: Architectural Energy Corporation, Boulder, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 09/776,319

(22) Filed: Feb. 2, 2001

(65) Prior Publication Data

US 2001/0019451 A1 Sep. 6, 2001

Related U.S. Application Data

(63) Continuation-in-part of application No. 09/249,664, filed on Feb. 12, 1999, now Pat. No. 6,239,910.

(51) Int. Cl.[7] ........................ G02B 17/00; G02B 27/00; A47H 1/00; E06B 9/08

(52) U.S. Cl. ........................ 359/596; 359/597; 160/104

(58) Field of Search ................................ 359/591, 593, 359/594, 596, 597; 160/104

(56) References Cited

U.S. PATENT DOCUMENTS

| | | | | | |
|---|---|---|---|---|---|
| 4,040,725 | A | * | 8/1977 | Goodbar | 359/596 |
| 4,351,588 | A | * | 9/1982 | Zullig | 359/592 |
| 4,509,825 | A | * | 4/1985 | Otto et al. | 359/592 |
| 4,517,960 | A | * | 5/1985 | Bartenbach | 359/596 |
| 4,557,565 | A | * | 12/1985 | Ruck et al. | 359/595 |
| 4,634,222 | A | * | 1/1987 | Critten | 359/596 |
| 4,883,340 | A | * | 11/1989 | Dominguez | 359/593 |
| 5,285,315 | A | * | 2/1994 | Stiles | 359/592 |
| 5,293,305 | A | * | 3/1994 | Koster | 362/147 |
| 5,648,873 | A | * | 7/1997 | Jaster et al. | 359/591 |
| 5,802,784 | A | * | 9/1998 | Federmann | 52/204.5 |

OTHER PUBLICATIONS

Littlefair, Paul J MA, PhD, Innovative Daylighting: Review of Systems and Evaluation Methods, vol. 22, No. 1, pp. 1–17.*

* cited by examiner

*Primary Examiner*—Christopher Mahoney
(74) *Attorney, Agent, or Firm*—Patton Boggs LLP

(57) ABSTRACT

The mini-optical light shelf daylighting system is implemented in the paradigm of a window treatment that is applicable to both new installations as well as existing window glazing. In particular, the mini-optical light shelf is a passive, static optical device which receives incident daylight transmitted through a window and efficiently redirects it uniformly onto the interior ceiling surface in a diffuse manner, thereby creating a useful source of interior illumination. The mini-optical light shelf comprises multiple shelves, each of which contains an identical optically shaped top surface to allow light to be efficiently collected and accurately directed onto the ceiling surface. The optical shelves are narrow and can be implemented in the paradigm of a window treatment. The window area is partitioned into a view related glazing section and a daylight collection and redirection glazing area. The occupant's views out of the building remain unobstructed through the view related area of the glazing to a height of approximately seven feet. Traditional window treatments can be used for this portion of the glazing for shading, privacy, and blackout control. The daylight incident on the daylight collection area of the glazing is collected and redirected onto the ceiling plane in a glare free uniform manner.

19 Claims, 7 Drawing Sheets

MINI-OPTICAL LIGHT SHELF DAYLIGHTING SYSTEM

CROSS REFERENCE TO RELATED APPLICATIONS

This application is a continuation-in-part of U.S. patent application Ser. No. 09/249,664, titled "Mini-Optical Light Shelf Daylighting System" and filed on Feb. 12, 1999.

FIELD OF THE INVENTION

This invention relates to interior space daylighting systems and, in particular, to a mini-optical light shelf daylighting system that implements an efficient daylighting system to redirect incident daylight on to the ceiling plane of an interior space to illuminate the interior space.

PROBLEM

It is a problem in the field of interior space illumination to provide a cost effective mode of illumination that makes use of the incident daylight without the need for complex systems or significant occupant intervention. Existing daylighting systems are of limited effectiveness, limited applicability due to their architectural limitations, or require complex and expensive mechanical and electronic control mechanisms.

Each year in the United States, over $350 billion is spent on energy for residential, commercial, and industrial buildings. Of this amount, more than $212 billion was spent during 1996 to purchase electricity, with 32% of that amount being used to operate commercial buildings: office, retail, institutional, but not industrial. Of this use, approximately 35% of the electricity consumption was related to lighting and another 6% was attributable to the air conditioning energy required to remove the excess heat generated by electric lighting. Thus, lighting is typically the largest end-use for electricity, annually consuming approximately 310 billion kWh.

There is a need for systems that provide improved energy efficiency and environmental quality in buildings. One such example is a system that reduces the consumption of electricity for lighting. One option for reducing electricity consumption for lighting is to use daylight to illuminate occupied building spaces during daylight hours. These systems are termed "daylighting systems." The key to the widespread use of daylighting systems is the provision of such a system that is both inexpensive and easily applied to both new and existing buildings. In addition to the savings attributed to reduced electricity consumption, daylighting systems typically also result in increased productivity by the occupants of the illuminated space, reduced health problems evidenced by the occupants of the illuminated space and pollution reduction. This is because there appears to be a strong correlation between the quality of the luminous environment and exposure to daylight and the overall health and productivity of the occupants. These ancillary benefits can produce savings that dwarf the savings attributable to electricity consumption reduction, since studies indicate that, over the life of the building, approximately 97% of the operating cost of commercial space is the salaries of the occupants and any improvement in the performance of the occupants of the building space results in a significant economic benefit.

One such existing daylighting system is the traditional interior light shelf, which comprises an optical device which receives daylight that is transmitted through a window and redirects it onto the interior ceiling plane, thereby creating a useful source of interior illumination. The basic light shelf concept typically comprises a wide flat elongated interior light shelf located adjacent to a window and protruding into a room from the exterior wall of a building, and/or an exterior light shelf of weather-resistant construction projecting from the exterior wall of the building, coplanar with the interior light shelf to receive incident daylight. The incident daylight is reflected by the interior and/or exterior light shelves onto the ceiling of the occupied space by a diffuse or specular horizontal or slightly sloped surface of the light shelf, which light reflecting surface is located above a view glazing. However, the interior light shelf typically protrudes a significant distance into the occupied space and is problematic from architectural, mechanical and aesthetic standpoints in many room applications.

Thus, the field of interior space illumination systems is devoid of an inexpensive, practical, effective and simple to use daylighting system that can be easily implemented in both existing building applications as well as in new building construction.

SOLUTION

The above-described problems are solved and a technical advance achieved in the field by the present mini-optical light shelf daylighting system. The mini-optical light shelf daylighting system is implemented in the paradigm of a window treatment that is applicable to both new installations as well as existing window glazing. In particular, the mini-optical light shelf daylighting system is a passive, static optical device that is typically mounted juxtaposed to a window opening of a building above head height. The mini-optical light shelf daylighting system receives daylight transmitted through the window and efficiently redirects it uniformly onto the interior ceiling plane of a room (or other interior space) in a diffuse manner, thereby creating a useful source of interior illumination.

The mini-optical light shelf daylighting system comprises multiple optical shelves, each of which allows light to be efficiently collected and accurately directed onto the ceiling plane of a room, while at the same time shading the occupants of the room from direct daylight penetration above 15° through the optical shelves. The optical shelves are narrow and can be implemented in the paradigm of a mini-blind window treatment. The window area is typically partitioned into a view related glazing section and a daylight collection and redirection glazing section. The occupant's views out of the building remain unobstructed through the view related section of the glazing to a height of approximately seven feet above the floor. Traditional window treatments can be used for this portion of the glazing for shading, privacy, and blackout control. The daylight incident on the daylight collection section of the glazing is collected by the optically shaped top surface of the optical shelves of the mini-optical light shelf daylighting system and redirected onto the ceiling plane of the room in a glare free, uniform manner.

The mini-optical light shelf daylighting system produces effective daylighting for typical ambient light levels for the perimeter zones of a building, and can operate for room depths in excess of 35 feet deep, depending on the particular implementation of the mini-optical light shelf daylighting system. The optical geometries of the optical shelves and the associated reflective surface characteristics cooperatively diffuse the collected daylight uniformly across the ceiling plane of the room. The resultant indirect lighting is striation free and substantially uniform in illuminance. The use of daylight preserves the visual and psychological connection between the occupants and the outdoors due to the subtle color and illuminance changes which occur throughout the day. Visual comfort is enhanced by evenly diffusing the daylight across the ceiling plane of the room from the perimeter wall to the interior extent of the illumination.

DETAILED DESCRIPTION

Glossary

The following definitions are provided to clarify the terminology used herein:

Room—The interior space of a building that can optionally be delimited by interior walls, floor, ceiling and, for the purpose of the examples used in the present description, is located juxtaposed to a window opening.

Building—A structure that serves to enclose a predefined set of interior space for use by occupants, which use includes residential, commercial, manufacturing, office, and the like without limitation.

Daylighting—The use of natural light from the sky under natural conditions (including daylight from both the solar disk and the sky dome) or overcast sky as an interior illuminant.

Daylighted Space—The space bounded by vertical planes rising from the boundaries of the daylighted area on the floor to the floor or ceiling above.

Daylight—As used herein, this term describes the natural light that is incident on a window glazing.

Figure 8:
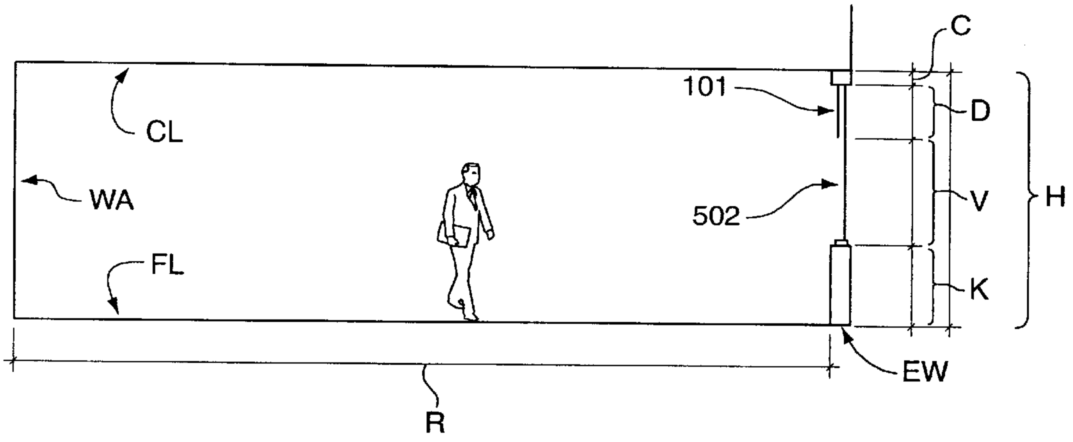
FIGS. 8 & 9 illustrate a side cross-section view of a typical interior space in which the present mini-optical light shelf daylighting system is installed.
Figure 9:
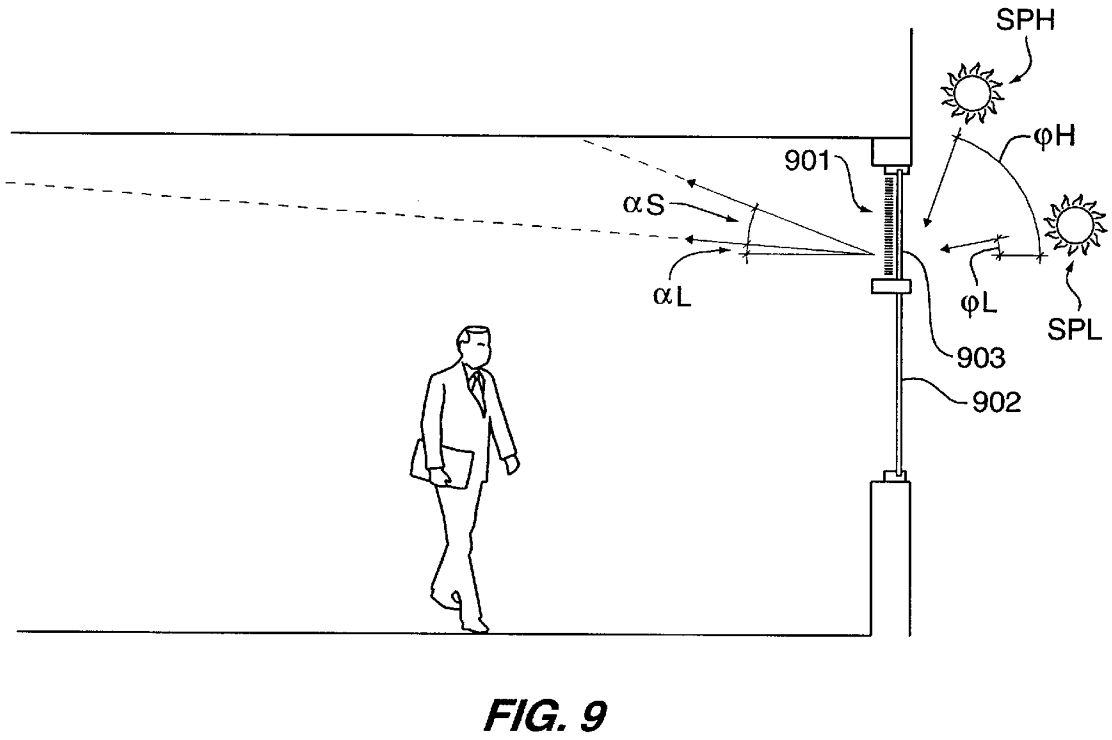

Theory of Operation of the Present Mini-Optical Light Shelf Daylighting System The typical interior space of a building in which the present mini-optical light shelf daylighting system 100 is used is illustrated in side cross-section view in FIGS. 8 & 9. This particular interior space is selected to illustrate the capabilities of the mini-optical light shelf daylighting system 100 and is not intended to limit the applicability of the concepts disclosed herein. Many non-residential spaces are configured in a manner that is identical to or similar to the arrangement shown in FIGS. 8 & 9 and this example serves to clearly illustrate the capabilities of the present mini-optical light shelf daylighting system 100. The space, termed "interior space" herein is shown as having an interior height H which is typically 9 feet 6 inches (approximately 3 meters) and a depth R that is typically 30 feet (approximately 10 meters) extending from the windows 502, which are located on the exterior wall EW, to an interior wall WA or other internal partition. The window configuration shown in FIG. 5 comprises a knee wall K of typical height of 3 feet (approximately 1 meter) in height, on top of which is installed a set of windows 502 which extend vertically typically another 6 feet (approximately 2 meters) and which are terminated at the top thereof by a small framing wall C, typically of height 6 inches (approximately 1/6 meter). The window glazing 502 is divided into two segments: view glazing V and daylighting glazing D. The window glazing 502 may be a single glazing element as shown in FIG. 8 or can be two separate elements 902, 903 as shown in FIG. 9. Within this interior space, the surfaces have typical light reflectance or light transmittance characteristics. Some typical values or ranges of values for light reflectance are: ceiling CL=0.8, wall WA=0.5, floor FL=0.2, vision glass=0.1 to 0.3 for a typical interior space. The light transmittance values for the window glass are up to 0.6 to 0.8 for typical window glass.

The mini-optical light shelf daylighting system 100 is positioned adjacent to the window glazing 502, 903 and located above the normal occupant viewing height. Thus, the typical installation of the mini-optical light shelf daylighting system 100 typically extends from seven feet (approximately 2⅓ meters) above the floor upward to the top of the window glazing 502 or the daylight glazing 903. The window glazing is partitioned into view related glazing V or 902 and daylighting glazing D or 903. The occupants views out of the building are unobstructed by the mini-optical light shelf daylighting system 100, since this system is located above the normal occupant viewing height. The mini-optical light shelf daylighting system 100 receives the unobstructed incident daylight that passes through the daylighting section D of the window glazing 502, collects this incident daylight and redirects it onto the ceiling surface CL in a glare free manner.

The primary optical objective of the mini-optical light shelf daylighting system 901, as shown by the ray tracing diagram in FIG. 9, is to redirect the incident daylight that arrives through the window glazing 902 of the building from a range of directions and altitude angles into a limited spread of light onto the ceiling of the interior space of the room. The sun typically changes position in the sky from a high location SPH at an angle of $\phi$H to a low sky position SPL at an angle of $\phi$L during the course of the day and year. The mini-optical light shelf daylighting system is a passive optical system which accomplishes this objective. Direct solar radiation arrives at the window plane 902 from constantly changing altitude and azimuth as a function of both time of day and season of the year. Diffuse sky radiation arrives from all visible areas of the sky dome. A significant amount of this incident light is redirected by the mini-optical light shelf daylighting system 901 into a narrow beam of light onto the ceiling of the room, that ranges from a low angle of $\alpha$L to a high angle of $\alpha$S. Ideally, this narrow spread of light $\alpha$S–$\alpha$L changes minimally over the course of the sun's path across the sky from SPH to SPL. The ambient light level in the interior space should be on the order of 25 to 35 foot candles, and while this intensity may not satisfy the task lighting needs at the desk plane of an open interior space, with the desk plane being 30 inches (approximately 1 meter) above the floor level, it does provide sufficient ambient lighting in the interior space to obviate the need for much of the interior space electric lighting.

Mini-Optical Light Shelf Daylighting System Architecture

Figure 1:
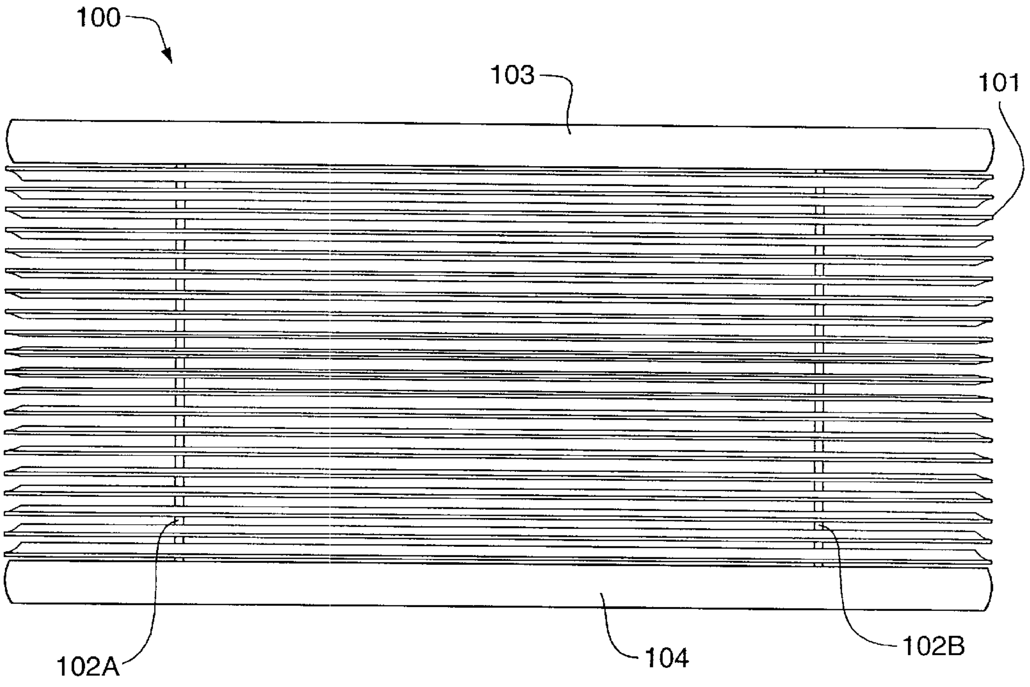
FIG. 1 illustrates a front perspective view in elevation of the present mini-optical light shelf daylighting system.

FIG. 1 illustrates a front plan view of the present mini-optical light shelf daylighting system 100. The optical shelves 101 used in the mini-optical light shelf daylighting system 100 are designed to match the solar profile angle which is created by viewing the incoming daylight in a section that is cut perpendicular to the window pane and through the depth W of the mini-optical light shelf daylighting system 100. For the same solar position, the profile angle varies as a function of the window orientation. It is desirable to use as much diffuse daylight as possible for the interior lighting of the room and it is therefore desirable to implement the optical shelves 101 to be operational over a wide range of profile angles to work with all solar positions using a single optical shelf shape. As shown in FIG. 9, the typical range of solar elevation during the course of the year results in usable daylight having a profile angle in the range from $\phi H$ to $\phi L$ (approximately 10° to 70°), since daylight below 10° is typically blocked by surrounding structures or vegetation and daylight above 70° has high reflectance losses due to the window glazing.

Figure 2:
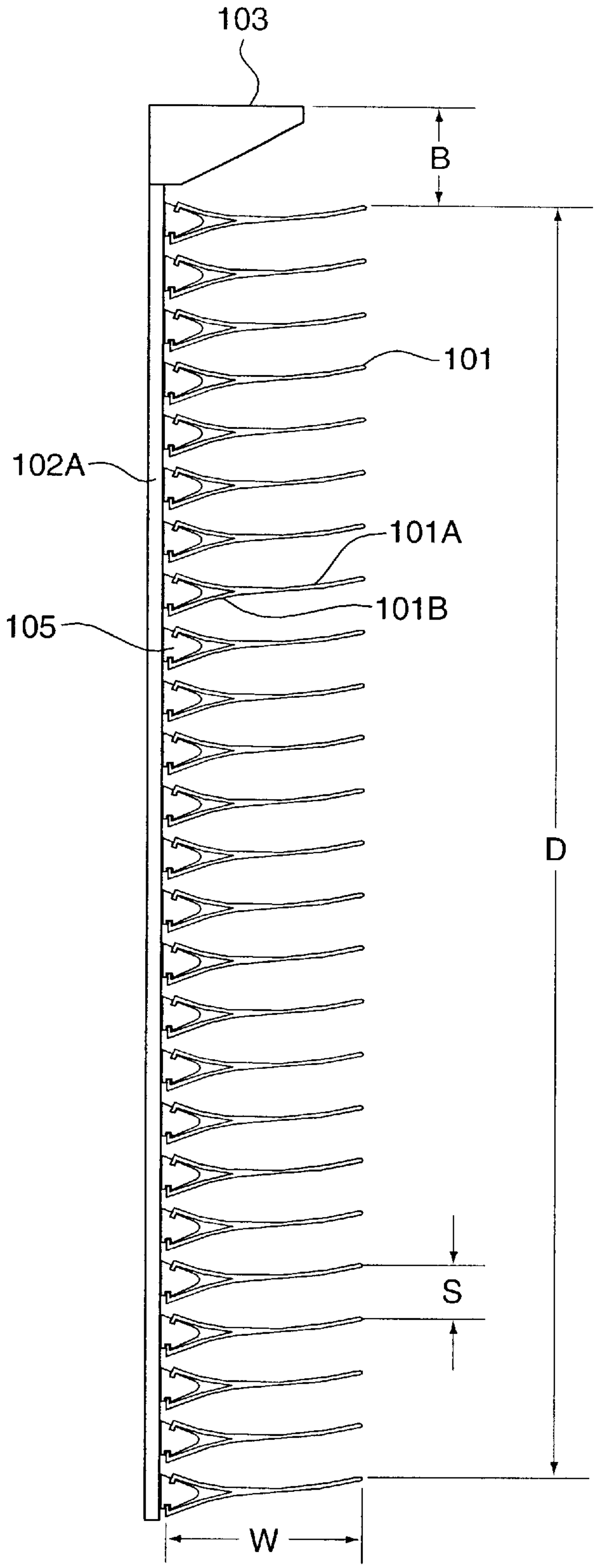
FIGS. 2 & 3 illustrate side cross-section views of the mini-optical light shelf daylighting system and a ray tracing diagram of a typical individual optical shelf of the mini-optical light shelf daylighting system, respectively.
Figure 3:
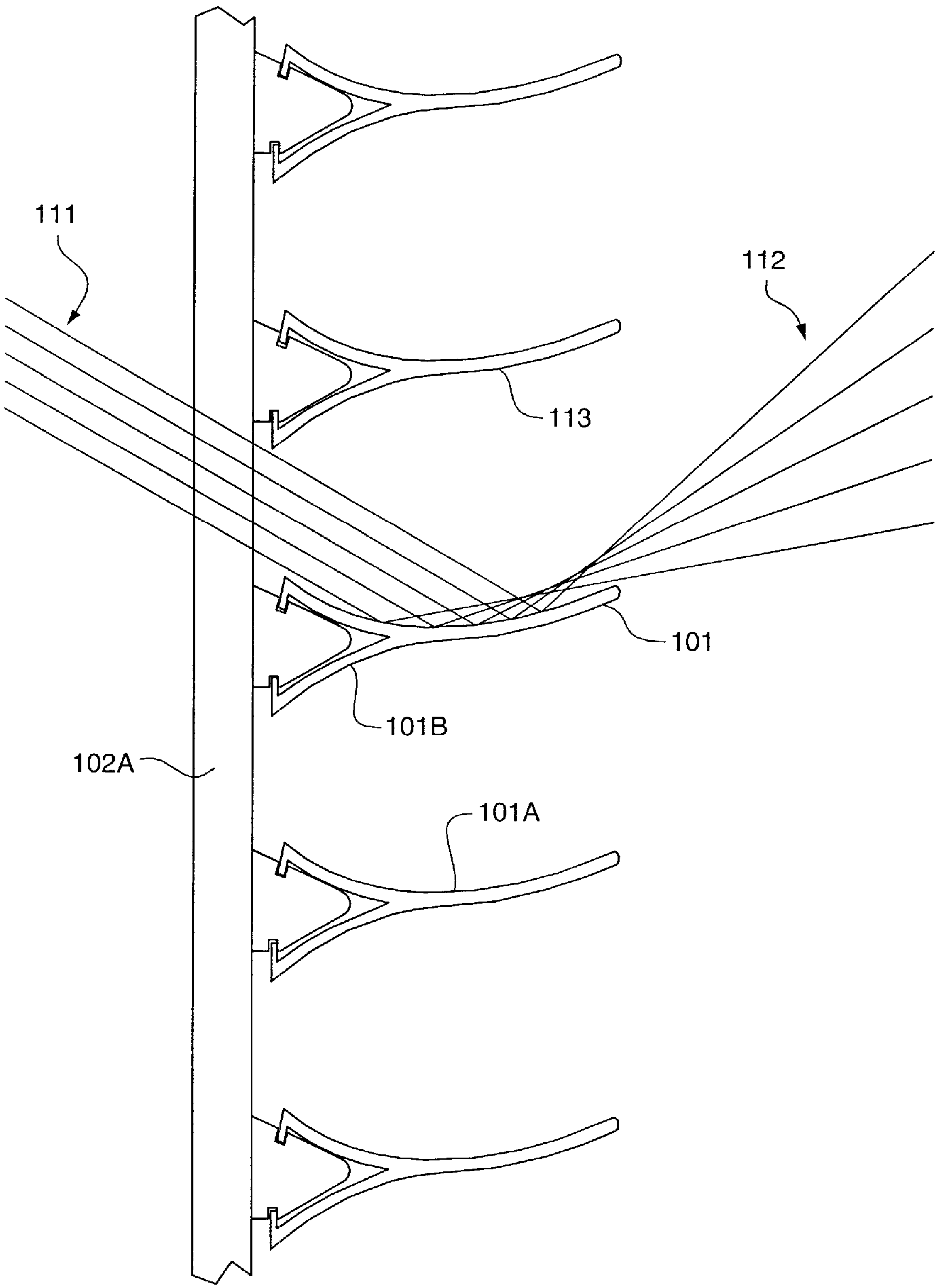
Figure 4:
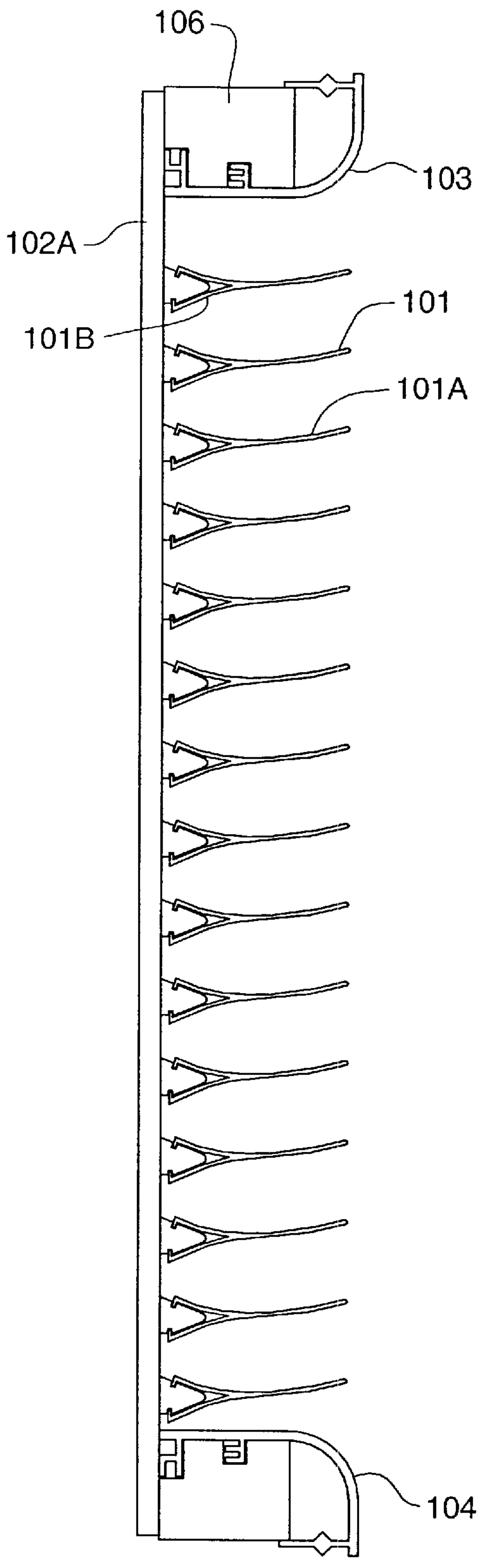
FIG. 4 illustrates a side perspective view of the present mini-optical light shelf daylighting system.

FIGS. 2 & 3 illustrate side cross-section views of the mini-optical light shelf daylighting system 100 and a ray tracing diagram that shows the operation of a typical individual optical shelf 101 of the mini-optical light shelf daylighting system 100, respectively, while FIG. 4 illustrates a side perspective view of the present mini-optical light shelf daylighting system 100. The mini-optical light shelf daylighting system 100 employs multiple optical shelves 101, each containing the same optically shaped light shelf surface 101A that is optionally coated and optimally optically shaped to allow the incident light 111 to be collected and accurately redirected 112 onto the ceiling surface CL without striking the bottom surface 113 of the adjacent optical light shelf. Therefore, the optical shelves are self-shading to prevent glare. The optical shelves 101 of the mini-optical light shelf daylighting system 100 are of depth W and construction to enable the mini-optical light shelf daylighting system 100 to be inexpensively manufactured and installed adjacent to the window 502. The mini-optical light shelf daylighting system 100 is constructed on a frame that includes vertical supports 102A, 102B and header 103, wherein the vertical supports 102A, 102B comprise a support for the multiple optical shelves 101. The vertical supports 102A, 102B are attached to a rigid header element 103 or some other mechanism that serves as the support member that is attached to the header of the window opening, for securing the mini-optical light shelf daylighting system 100 in place in the window opening. The header element 103 is oriented to be in a parallel, spaced apart relationship with the top-most optical shelf, wherein the header element 103 is spaced from the top-most optical shelf by a distance B, which is typically on the order of 2 inches. For a retrofit situation, a rigid footer 104 is also used and is attached to the frame elements 102A, 102B and functions as a support member for the vertical supports 102A, 102B. This architecture enables the mini-optical light shelf daylighting system 100 to be installed in existing interior spaces as well as new construction.

Light Reflective Element Attachment Apparatus

Figure 5:
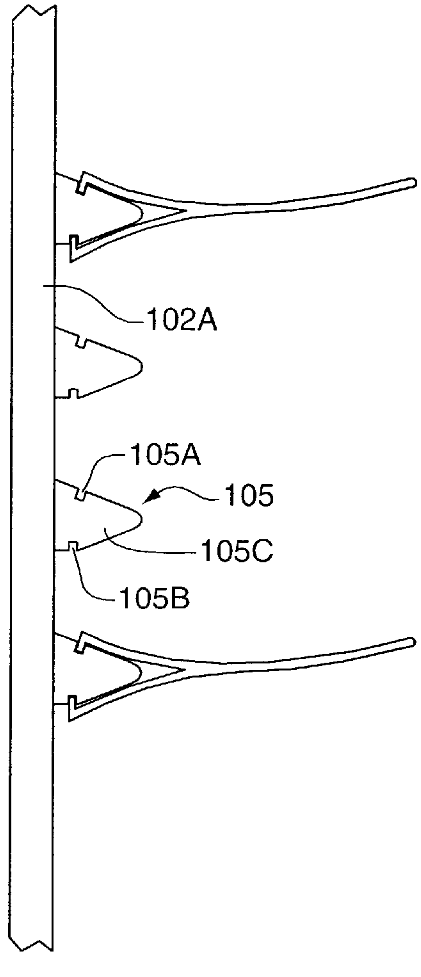
FIGS. 5 & 6 illustrate additional details of the optical shelf attachment apparatus of the present mini-optical light shelf daylighting system.
Figure 6:
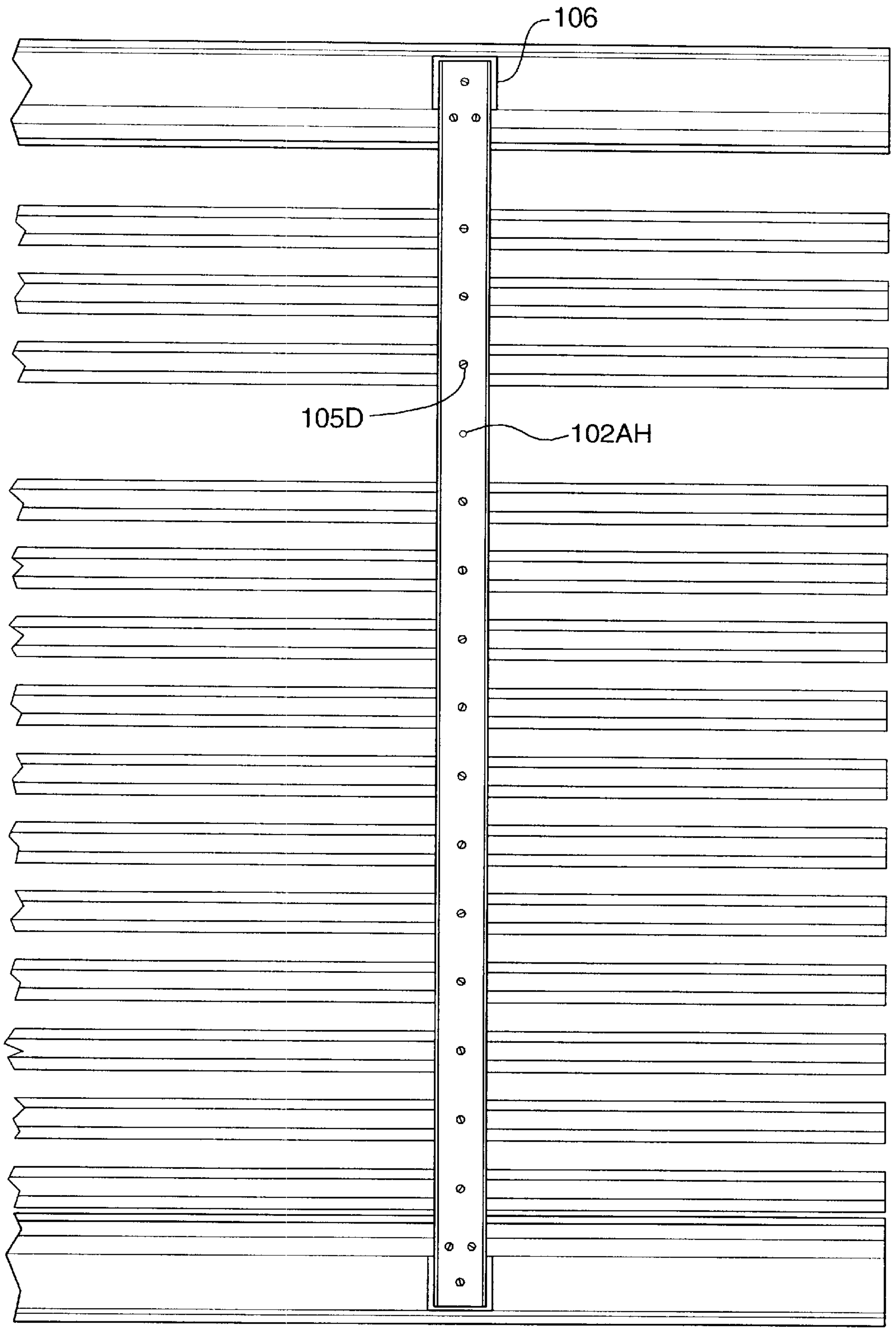

FIGS. 5 & 6 illustrate details of a typical optical shelf attachment apparatus and the vertical supports 102A, 102B of the present mini-optical light shelf daylighting system 100. In this example, the optical shelves 101 of the mini-optical light shelf daylighting system 100 are held in place on the vertical supports 102A, 102B using clips 105 that are attached to vertical supports 102A, 102B, two of which are shown in the present example. Each clip 105 comprises a body 105C of shape and dimensions to conform to the opening between the light shelf surface 101A and light blocking feature 101B. The body 105C has formed therein features 105A, 105B (slots in this example) to receive mating features (fingers 101C, 101D) that are formed on optical shelves 101. The optical shelves 101 therefore simply snap fit on to the clips 105 where the finger 101C of light shelf surface 101A and finger 101D of light blocking feature 101B fit into their respective mating slots 105A, 105B of clip 105. The vertical supports 102A, 102B are manufactured with a plurality of holes 102AH formed therein, each hole 102AH being adapted to receive a tab 105D that is formed on the base of clip 105, such that the clips 105 can be press fit into the predetermined locations determined by the holes 102AH in the vertical supports 102A, 102B. This interconnection apparatus enables the optical shelves 101 to be precisely positioned in the mini-optical light shelf daylighting system 100 and to be simply removed therefrom.

A typical maximum distance between the vertical supports in a mini-optical light shelf daylighting system 100 is 5 feet and a typical maximum cantilevered distance of the optical shelves 101 beyond a vertical support 102A, 102B is 2.5 feet. The mini-optical light shelf daylighting system 100 is attached to the window header by use of a mounting bracket 106 at the top of the vertical supports 102A, 102B, which mounting bracket 106 is screwed directly into the header/mullion system of the window frame. These vertical supports 102A, 102B rest in close proximity to the window glazing 502 to position the mini-optical light shelf daylighting system 100 parallel to the plane of the window.

Light Reflective Element Optical Features

An additional objective of the mini-optical light shelf daylighting system 100 is to shade most of the low altitude daylight to thereby prevent the incident daylight 111 from creating direct glare as well as reflected glare on work surfaces that are located in the interior space. The shading of all direct daylight is not necessary since a transitory period of direct daylight in the early morning and late afternoon, if kept to a minimum, is not objectionable. The mini-optical light shelf daylighting system 100 should preferably shade solar altitude angles that are above a predetermined angle $\omega$, such as between 5° and 10° to thereby minimize this problem. The use of light blocking feature 101B located proximate the window opening provides the necessary control of the incident daylight 111 to shade the low altitude daylight, as is described below.

The optical shelves 101 of the mini-optical light shelf daylighting system 100 have an unique geometry which consists of 2 adjoining arcs with descending radii forming a slat (with a typical W=2.2 inches) having a specular top optical surface. This unique geometry of the optical shelves 101 optimally redirects light upwards without light striking the bottom surface of the adjacent optical shelf to thereby prevent glare.

The mini-optical light shelf daylighting system 100 provides direct solar shading of interior task surfaces, using the spacing between adjacent optical shelves 101 and also by use of light blocking feature 101B, while efficiently collecting, redirecting and diffusing daylight across the interior ceiling surface CL. The light blocking feature 101B is a segment that is integral to light reflecting surface 101A and extends therefrom at a predetermined location toward the window glazing 502, forming an acute angle with the light reflecting surface 101A. In this regard, the light reflecting surface 101A and the light blocking feature 101 B together form a Y-shaped element. The optical shelves 101 of the mini-optical light shelf daylighting system 100 are substantially linear and geometrically identical, mounted parallel in orientation and identically spaced vertically at intervals S, where a typical value of S=1 inch for the case where W=2.2 inches.

The mini-optical light shelf daylighting system 100 functions independent of the building's window glazing system and therefore can be used with any commercially available glazing product in both new construction and in a retrofit application. The mini-optical light shelf daylighting system 100 is totally static and requires no adjustment of tilt throughout the day or during the year to account for variations in the position of the sun in the sky.

Optical Characteristics of Mini-Optical Light Shelf Daylighting System

Figure 7:
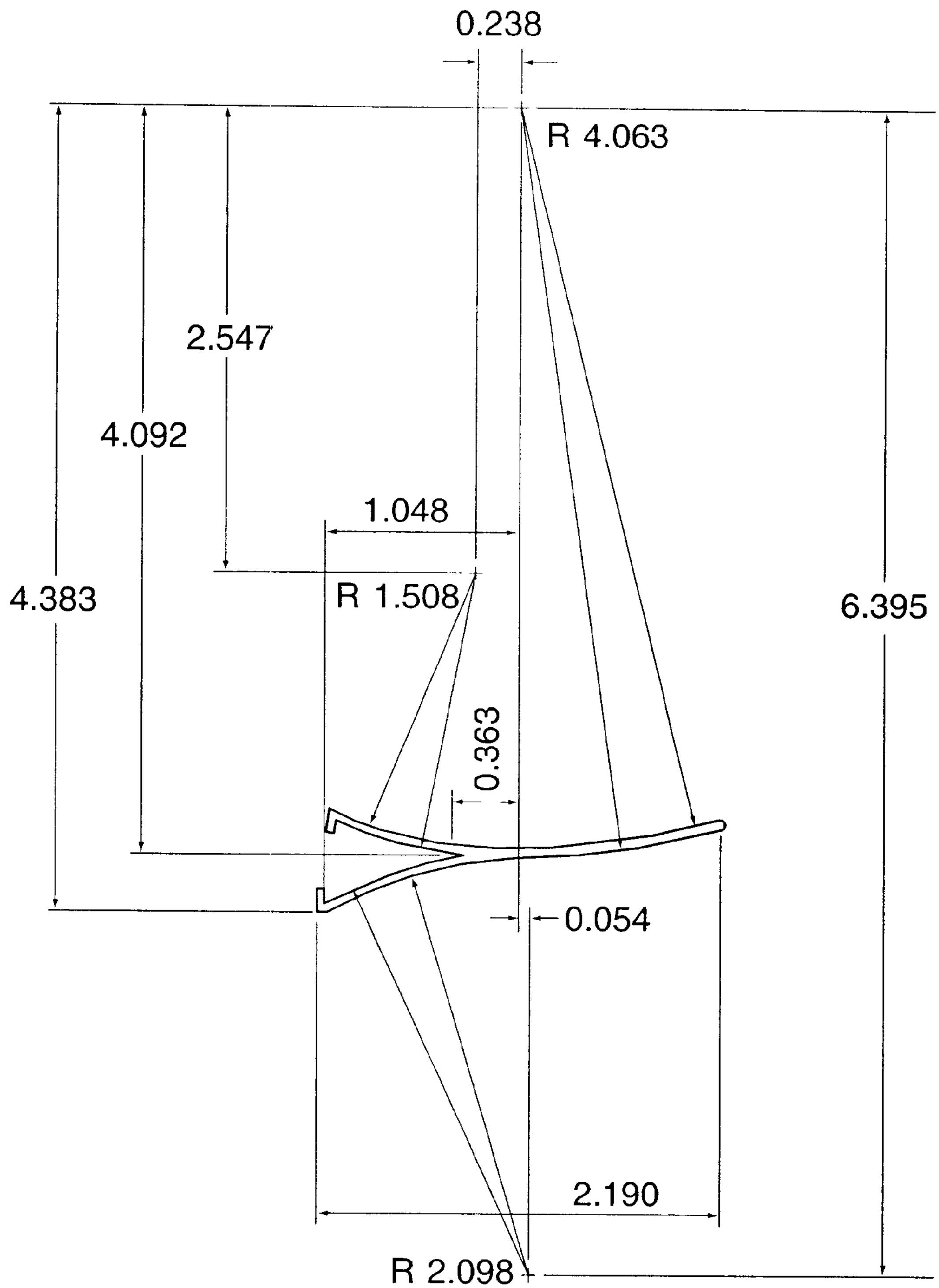
FIG. 7 illustrates a side cross-section view of a typical individual optical shelf of the mini-optical light shelf daylighting system and typical dimensions thereof.

The optical characteristics of the mini-optical light shelf daylighting system can be understood by referencing FIG. 7 which illustrates a side cross-section view of a typical individual light shelf 101 of the mini-optical light shelf daylighting system 100 and typical dimensions thereof. The optical surface 101A of the optical shelves 101 uses a different portion of the optical surface for different profile angles. High profile angles use the forward end of the optical surface 101A while low profile angles use the back portion of the optical surface 101A. Thus, for a particular profile angle, only a limited portion of the optical surface 101A is used to reflect the incident daylight. As the profile angles vary, the incident daylight strikes a portion of the optical surface 101A that presents reflection characteristic that maintains the reflected light in a predetermined desired range of reflected angles to illuminate the interior ceiling surface CL. Thus, the cross-section of the optical shelf 101 illustrated in FIG. 7 has a leading edge that has a tighter radius than the trailing edge. The larger profile angles hit only a small portion of the leading edge so this incident daylight requires a steeper reflecting angle and must also be spread out to illuminate a wide area, thereby requiring a small radius smooth curve reflecting optical surface 101A. The lower profile angle incident daylight is incident on a larger portion of the optical surface 101A and therefore requires a flatter, larger radius curvature to spread out to illuminate a wide area.

FIG. 7 also illustrates typical dimensions that have been used in a proof-of-concept prototype of the optical shelf 101. These dimensions are simply exemplary of those that can be selected to implement the functionality of the mini-optical light shelf daylighting system. It is understood that a wide variety of alternative implementations are possible, including more than 2 arcs to implement the light reflecting surface, different methods of attaching the optical shelves to the frame, different curvature and dimensions of the various surfaces of the optical shelf, and the like.

The projected light should have a smooth gradient over the entirety of the ceiling surface CL. Each column of incident daylight requires a slight spread that varies as profile angle, and the profile angles vary overtime, the optical surface 101A should have a smooth continuous surface. The spacing between adjacent optical shelves 101 can be used to regulate the shading performed by the mini-optical light shelf daylighting system 100. One element of the design of the mini-optical light shelf daylighting system 100 is that the optical shelves 101 project light into the interior space at a shallow angle, so the location of the optical surface 101A must allow it to project its light at a shallow angle over the trailing edge of the optical shelf 101, which trailing edge performs the dual functions of shading the interior space from direct daylight and to block the optical surface 101A from direct view of the occupants. These design criteria implies that the optical surface 101A must have a large aspect ratio in the form of a shallow slat design.

The redirected incident daylight uniformly illuminates the ceiling surface from a location proximate to the window glazing to the full depth of the interior space. It is obvious that by varying the spacing between the adjacent optical shelves as well as their curvature and scale of the shelf, the spread of illumination and the intensity of the illumination can be controlled. This enables the basic design to be adapted for different depth interior spaces and for window glazing of different heights.

Summary

The mini-optical light shelf daylighting system comprises multiple shelves, each of which contains an identical optically shaped top surface to allow light to be efficiently collected and accurately and uniformly directed onto the ceiling plane of an interior space while at the same time shading the occupants from direct daylight penetration through the shelves. The optical shelves are narrow and can be implemented in the paradigm of a window treatment to collect incident daylight and redirect the incident daylight onto the ceiling plane in a glare free manner.

What is claimed:

1. A daylighting apparatus, mountable adjacent to a window opening located on a wall of a room, for redirecting incident sunlight into said room to illuminate said room, comprising:

frame means for mounting said daylighting apparatus juxtaposed said window opening, where said window opening presents an occupant of said room with a field of view to look through said window opening; and a plurality of identical light reflecting element means, mounted in said frame means in a fixed position, that is a substantially parallel, equally spaced apart relationship, for redirecting said incident sunlight into said room, each of said light reflecting element means comprising:

an elongated substantially linear member having a first edge located proximate said window opening and a second edge distal from said first edge, and having a top surface and a bottom surface, said top surface being of a geometry to redirect said incident sunlight received from a predetermined range of directions onto a predetermined region of a ceiling surface of said room absent said redirected incident sunlight being transmitted into said field of view, light blocking element means, integral to said bottom surface at a predetermined location and extending at an acute angle with reference to said top surface toward said first edge, for blocking low altitude components of said incident sunlight from entering said room.

2. The daylighting apparatus of claim 1 wherein said frame means comprises:

a plurality of vertical support members for supporting said plurality of identical light reflecting element means; and header means attached to said plurality of vertical support members at a top thereof for maintaining said plurality of vertical support members in a parallel, equally spaced apart relationship and for enabling said daylighting apparatus to be mounted juxtaposed said window opening.

3. The daylighting apparatus of claim 2 wherein said frame means further comprises:

a plurality of apertures formed at predetermined locations in each of said plurality of vertical support members; and a plurality of clip means connectable to said plurality of apertures for interconnecting with said plurality of identical light reflecting element means to support said plurality of identical light reflecting element means in a substantially parallel, equally spaced apart relationship.

4. The daylighting apparatus of claim 3 wherein each of said plurality of clip means comprises:

a body of shape and dimensions to fit between said bottom surface of said elongated substantially linear member and said light blocking element means; and at least one feature formed in said body to receive a mating feature formed on at least one of said bottom surface of said elongated substantially linear member and said light blocking element means.

5. The daylighting apparatus of claim 3 wherein each of said plurality of clip means comprises:

a body of shape and dimensions to fit between said bottom surface of said elongated substantially linear member and said light blocking element means;

a first slot formed in said body to receive a finger formed on said bottom surface of said elongated substantially linear member; and a second slot formed in said body to receive a finger formed on said light blocking element means.

6. The daylighting apparatus of claim 2 wherein said frame means further comprises:

footer means attached to said plurality of vertical support members at a bottom thereof for maintaining said plurality of vertical support members in a parallel, equally spaced apart relationship.

7. The daylighting apparatus of claim 2 wherein said light blocking element means comprises:

a complex curvilineal surface, having a top surface and a bottom surface, wherein different portions of said top surface receive and block said incident daylight for different angles of said incident daylight.

8. The daylighting apparatus of claim 1 wherein said top surface of said elongated substantially linear member comprises:

a smooth reflective surface, responsive to receipt of incident daylight at profile angles between 10 and 70 degrees for projecting said received incident daylight up to 20 degrees above the horizontal.

9. The daylighting apparatus of claim 1 wherein said top surface of said elongated substantially linear member comprises:

a complex curvilineal surface, wherein different portions of said top surface receive said incident daylight for different angles of said incident daylight.

10. The daylighting apparatus of claim 9 wherein said complex curvilinear surface has a leading edge with a tighter radius than a trailing edge of said complex curvilinear surface.

11. A daylighting apparatus, mountable adjacent to a window opening located on a wall of a room, for redirecting incident sunlight into said room to illuminate said room, comprising:

a plurality of support members having a top end and a bottom end;

header means attached to said plurality of support members at said top end thereof for maintaining said plurality of support members in a vertically oriented, parallel, spaced apart relationship when said header means is attached to a header of said window opening, where said window opening presents an occupant of said room with a field of view to look through said window opening; and a plurality of identical light reflecting element means, mounted on said plurality of support members in a fixed position, that is a substantially horizontally oriented, parallel, equally spaced apart relationship, for redirecting said incident sunlight into said room, each of said light reflecting element means comprising:

an elongated substantially linear member having a first edge located proximate said window opening and a second edge distal from said first edge, and having a top surface and a bottom surface, said top surface being of a geometry to redirect said incident sunlight received from a predetermined range of directions onto a predetermined region of a ceiling surface of said room absent said redirected incident sunlight being transmitted into said field of view, light blocking element means, attached to said bottom surface at a predetermined location and extending at an acute angle with reference to said top surface toward said first edge, for blocking low altitude components of said incident sunlight from entering said room.

12. The daylighting apparatus of claim 11 wherein each of said plurality of support members comprises:

a plurality of apertures formed at predetermined locations in each of said plurality of support members; and a plurality of clip means connectable to said plurality of apertures for interconnecting with said plurality of identical light reflecting element means to support said plurality of identical light reflecting element means in a substantially parallel, equally spaced apart relationship.

13. The daylighting apparatus of claim 12 wherein each of said plurality of identical light reflecting element means further comprises:

at least one feature formed on at least one of said bottom surface of said elongated substantially linear member and said light blocking element means to interconnect with a mating feature formed in said clip means.

14. The daylighting apparatus of claim 13 wherein each of said plurality of clip means comprises:

a body of shape and dimensions to fit between said bottom surface of said elongated substantially linear member and said light blocking element means;

a first slot formed in said body to receive a finger formed on said bottom surface of said elongated substantially linear member; and a second slot formed in said body to receive a finger formed on said light blocking element means.

15. The daylighting apparatus of claim 11 further comprising:

footer means attached to said plurality of support members at said bottom end thereof for maintaining said plurality of vertical support members in a parallel, equally spaced apart relationship.

16. The daylighting apparatus of claim 11 wherein said light blocking element means comprises:

a complex curvilineal surface, having a top surface and a bottom surface, wherein different portions of said top surface receive and block said incident daylight for different angles of said incident daylight.

17. The daylighting apparatus of claim 11 wherein said top surface of said elongated substantially linear member comprises:

a smooth reflective surface, responsive to receipt of incident daylight at profile angles between 10 and 70 degrees for projecting said received incident daylight up to 20 degrees above the horizontal.

18. The daylighting apparatus of claim 11 wherein said top surface of said elongated substantially linear member comprises:

a complex curvilinear surface, wherein different portions of said top surface receive said incident daylight for different angles of said incident daylight.

19. The daylighting apparatus of claim 18 wherein said complex curvilineal surface has a leading edge with a tighter radius than a trailing edge of said complex curvilinear surface.

* * * * *